May 16, 1961  I. H. PAGE  2,984,800
DELAY LINE FOR WAVE SIGNALS
Filed Oct. 26, 1951  2 Sheets-Sheet 1
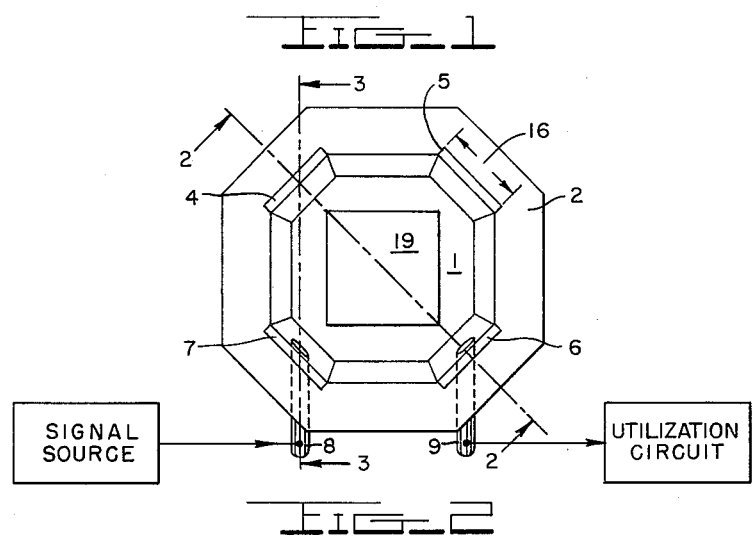
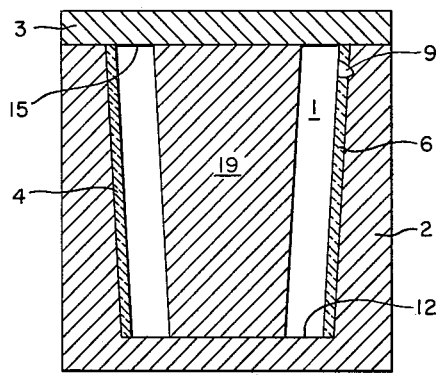
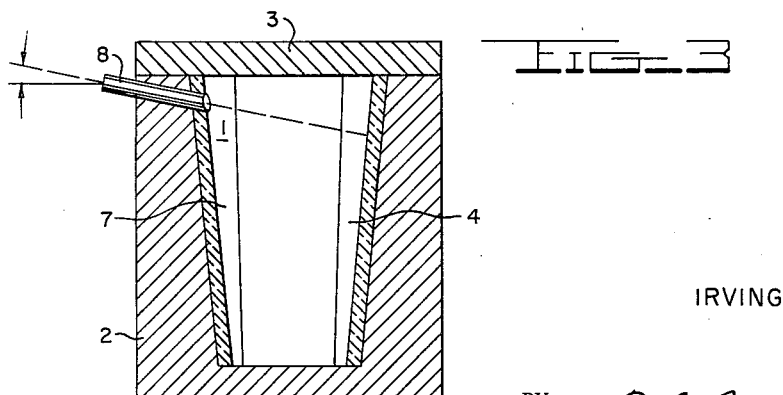
INVENTOR
IRVING H. PAGE
BY
ATTORNEYS

INVENTOR
IRVING H. PAGE

United States Patent Office 2,984,800
Patented May 16, 1961

2,984,800

DELAY LINE FOR WAVE SIGNALS

Irving H. Page, Naval Research Laboratory,
Anacostia Station, Washington, D.C.

Filed Oct. 26, 1951, Ser. No. 253,439

7 Claims. (Cl. 333—30)

(Granted under Title 35, U.S. Code (1952), sec. 266)

This invention relates to a delay line for compressional wave signals, and more particularly to a delay line of the type wherein a compressional wave signal is delayed in time while traveling between two points by being made to follow a circuitous path within a confined space.

It is known in the prior art that a compressional wave may be advantageously delayed by subjecting it to a number of reflections, in traveling from one point to another, to divert the wave from its normally straight path of travel into a more circuitous path of much greater length. Heretofore the path of travel of a wave has been lengthened by multiple reflections within a single plane to produce such a delay, the wave being reflected back and forth many times within a generally planar locus before ultimately being directed to its destination point. A delay device of this type is shown for example in my copending application No. 688,413 filed August 5, 1946. The present invention is a substantial improvement over devices of the type therein described, and enables the attainment of a much larger delay in proportion to the physical size of the apparatus involved than has heretofore been possible.

Briefly stated, the invention provides for a delay of the wave by submitting it to a plurality of successive reflections in more than a single plane, thereby extending its circuitous path of travel through three dimensions. This invention takes advantage of those principles of physics which provide that compressional waves are reflected from a surface with an angle of reflection equal to their angle of incidence, and that if a compressional wave is progressively reflected between two surfaces which intersect at an angle $\theta$, the angle of incidence of the wave in the plane of the angle $\theta$ is progressively changed during each reflection by an amount proportional to the angle $\theta$. Thus if a sharp pencil-like beam of compressional wave energy is progressively reflected in the plane of the angle $\theta$ between two such surfaces in such a manner as to gradually decrease its angle of incidence, this angle of incidence will progressively vary so that it first decreases to zero and then increases from zero with an opposite sense. That is, the path of travel of the wave will double back upon itself. By combining this phenomenon with that of the recurrent planar reflections of a sharply focused beam within an equilateral polygon, there results an orientation for the wave reflecting means in a compressional wave delay line which produces an unusually long three-dimensional path of travel for the reflected wave.

It is one object of this invention to provide a delay line for compressional wave signals wherein a large time delay of a compressional wave may be obtained relative to the physical size of the delay line.

It is another object to provide a delay line for compressional waves wherein said waves may be multiply reflected through a three dimensional circuitous path of travel between two points.

It is another object to provide a delay line for compressional waves which may be readily adjusted to provide any desired amount of delay.

Other objects and features of the present invention will become apparent from the following detailed description considered in connection with the accompanying drawings, which disclose one embodiment of the present invention. It should be understood, however, that the drawings are designed for purposes of illustration only, and not as a definition of the limits of the invention, as to which reference should be made to the appended claims.

In the drawings, wherein similar reference characters denote similar elements throughout the several views:

Figure 1 is a plan view of a delay line, with cover plate removed, embodying the principles of the present invention.

Figure 2 is a sectional illustration through line 2—2 of Figure 1.

Figure 3 is a sectional illustration through line 3—3 of Figure 1.

Figure 4:
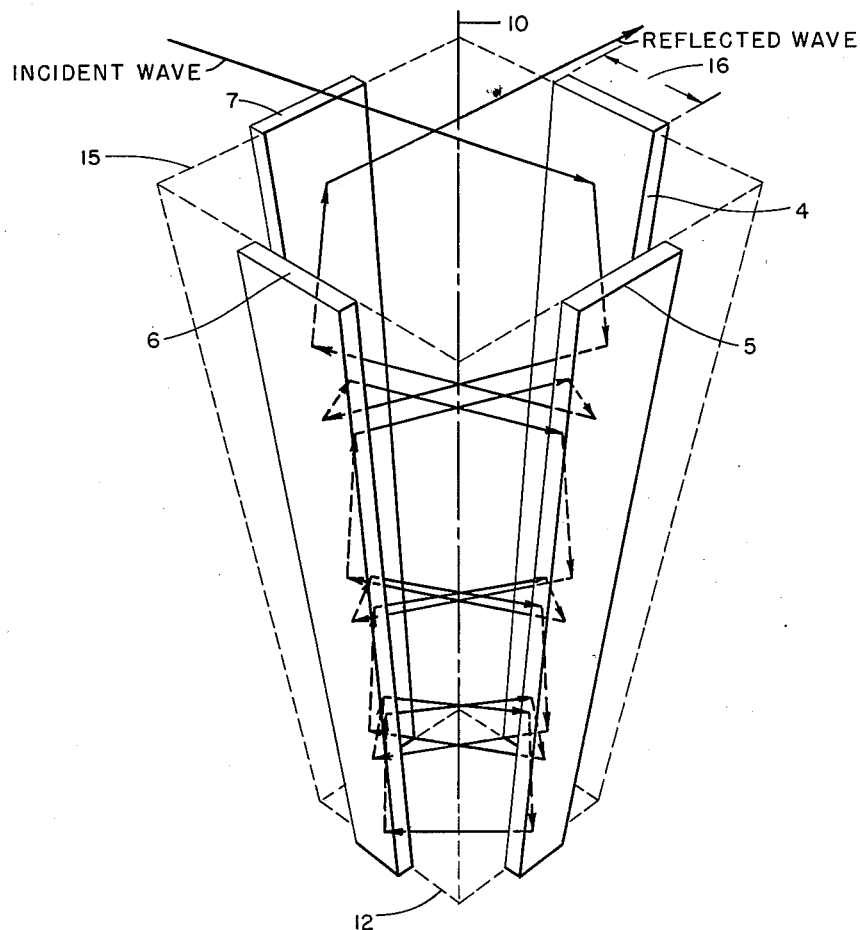
Figure 4 is a schematic diagram of the path of travel of a compressional wave in a delay line embodying the principles of the present invention.

A delay line constructed in accordance with the principles of the present invention may be described as follows. Referring to Figure 1, the delay line includes a volume of transmitting medium for the compressional waves, which medium may be solid, liquid or gaseous in state. The transmitting medium is enclosed or supported within a container 2, having a cover plate 3. Within the transmitting medium 1 and supported from the container 2 is disposed a plurality of reflectors, 4, 5, 6, 7, planar in form, and made of a material which is preferably substantially mismatched in acoustic impedance with the transmitting medium, so that absorption of the wave energy during reflection will be kept at a minimum. Also supported from the container 2 is compressional wave source or generator, which consists of a highly directional input electrical-mechanical transducer 8, which may be energized by any externally supplied signal to be delayed, and a similar output transducer 9 for intercepting and recovering the delayed wave from the medium 1, and converting it to a form suitable for further utilization. One form of transducer which it has been found satisfactory to use for these purposes in the supersonic frequency band is a quartz piezoelectric crystal, but any directive transducer known to the art may be used if desired.

It is desirable to choose a transmitting medium 1 having an acoustic impedance which matches that of the transducers 8 and 9, to obtain maximum bandwidth of the transmitting medium and to maintain good fidelity of the compressional wave signal to be reflected. With quartz crystal transducers, for example, a well matched transmitting medium 1 is liquid mercury. In this medium one material which may be satisfactorily used for the reflectors 4, 5, etc., is plate glass. The material for the transmitting medium container 2 is not critical except that when used to provide support for the reflectors 4, 5, etc,. and transducers 8 and 9, it should preferably be dimensionally stable.

In accordance with this invention the reflectors 4, 5, 6, 7 are preferably disposed within the transmitting medium 1 in such a manner that their reflecting surfaces are oriented in coincidence with, or lie within the locus of, the sides of a right equilateral prismoid, or truncated pyramid. The orientation of the reflectors in this fashion is shown more clearly in the schematic drawing of Figure 4. The side walls of the geometric figure so defined slope at small equal angles with respect to its axis 10, and are symmetrically disposed about this axis 10. These walls have equal angles of intersection in cross-sectional planes perpendicular to the axis 10, and such cross-sectional planes therefore define equilateral polygons. It may be shown that to achieve reflection of a ray or sharply focused beam of wave energy through a closed path within such a polygon the angle of incidence of the ray with its first reflecting surface, measured in the plane of the polygon, should be one-half the angle of intersection of the sides of the polygon. In the four sided prismoid shown in Figure 4, these equilateral polygons will of course be squares, the angle of intersection of whose sides is 90°.

The directional input transducer 8, which as explained above may take the form of a quartz crystal, is mounted in container 2 so as to direct the compressional wave energy as a sharply focused beam against the first reflecting surface 4 at an angle of incidence in the plane perpendicular to the prismoid axis 10 substantially equal to that above described, i.e., one-half the angle of intersection of the sides of the cross-sectional equilateral polygon, and at a small angle of incidence in the plane of the prismoid axis. The resulting path of travel of the wave will be as shown more fully in the schematic drawing, Figure 4. It may be seen from Figure 4 that the wave undergoes successive reflections from the plural reflectors 4, 5, etc., which carry it around the prismoid axis 10 in a circulatory fashion while causing it to travel progressively in an axial direction within the prismoid, so that the resulting path is somewhat helical. The initial angle of incidence of the wave in the plane of the prismoid axis 10 is chosen so that initially the wave progresses toward the smaller end 12 of the prismoid as it circulates around the prismoid axis 10. In accordance with the principle of physics hereinbefore set forth, it can be shown that the angle of incidence of a wave so reflected, measured in planes through the axis of the prismoid, progressively decreases during each reflection by an amount equal to one-half of the angle of convergence of the sloping sides of the prismoid. Thus if the sides of the prismoid, or the reflectors 4, 5, 6 and 7 coincident therewith, each slope with respect to the prismoid axis 10 at an angle of 5°, so that the angle of convergence of opposite sides is 10°, and the initial angle of incidence in the plane of the prismoid axis of the wave when first introduced into the transmitting medium is 60°, after twelve reflections this angle of incidence will be zero. Meanwhile if the equilateral prismoid has four sides, as shown, the wave will have been reflected around the prismoid axis 10 three complete times. On the thirteenth reflection, however, the angle of incidence of the wave in the plane of the prismoid axis will again be decreased by 5° so that its new value will be minus 5°. This means that the path of the incident wave now forms an angle of 5° in the plane of the prismoid axis with a perpendicular to the reflecting surface, but on the side opposite to its position while the wave was progressing axially toward the smaller end 12 of the prismoid. Thus after the twelfth reflection the axial component of the wave path reverses direction, and while continuing to circulate around the axis 10 the wave commences to travel axially back toward the larger end 15 of the prismoid.

Due to this reversal of the axial component, the length of the circuitous path which the wave travels within the prismoid is effectively doubled.

In practice the reflectors, 4, 5, etc., are mounted with an angle of slope relative to the prismoid axis 10 much smaller than 5°, so that a very large number of reflections will be required to reduce to zero the angle of incidence in the plane of the prismoid axis. The reflectors 4, 5, etc., must have sufficient length in the axial direction to accommodate the axial progression of the wave during this large number of reflections. In this way a very long path of travel for the reflected wave is achieved, which provides a long time delay. It will be recognized of course that the larger the angle of slope of the reflectors, the more quickly will the axial travel of the wave toward the smaller end 12 be reversed, the smaller will be the axial length of the reflectors required for the wave to reverse its axial direction, and the smaller will be the resultant path length and signal delay. This angle of slope may be adjusted by shimming the reflectors, or by other conventional mechanical adjusting means, not shown, so that any desired amount of delay may be achieved.

It should be noted that the particular three dimensional circuitous path of the multiply-reflected wave thus described has the unique advantage of enabling the incidence angle in one plane, i.e., that of the axis 10, to be reduced to zero without undue loss of wave energy by refraction, because the angle of incidence in another plane, i.e., perpendicular to the axis, is maintained large enough to preserve substantially total reflection.

The output transducer 9 is suitably positioned to intercept the path of the axially returning wave after it has traveled a total circuitous path length equal to the desired delay.

The reflectors 4, 5, 6, 7 have been described as mutually disposed in the relationship of the sides of a right equilateral prismoid. In practice, a reflecting surface need not occupy an area as large as that of an entire side of the prismoid, but may be of any desired length in the direction of axis 10, and may have a lateral dimension 16, as shown in Figure 4, merely sufficient to intercept and reflect all of the beam of wave energy.

Also the central or axial portion of the volume of transmitting medium 1, through which the multiply reflected wave energy does not travel, may be replaced if desired by material lighter or cheaper than the medium 1, as shown at 19.

While only a single embodiment of the present invention has been shown and described, it will be understood that many changes and modifications may be made therein without departing from the spirit of the invention, as defined by the appended claims. For example, the equilateral prismoid herein described may have any desired number of sides, and alternatively one or more of the sides may slope relative to the prismoid axis at an angle of zero degrees.

The invention described herein may be manufactured and used by or for the Government of the United States of America for governmental purposes without the payment of any royalties thereon or therefor.

What is claimed is:

1. A delay line for compressional waves comprising means for directing said compressional waves in a selected direction, an equilateral right prismoid having a top larger than its bottom and composed of material having an acoustic impedance to said compressional waves which is substantially matched with that of said directing means, means for reflecting said compressional waves having an acoustic impedance mismatched with that of said prismoid material, means supporting said reflecting means in coincident relation with each of the sides of said prismoid and symmetrically disposed about its axis, means for supporting said directing means to direct said compressional waves into said prismoid near said top and against the reflecting means in one of its sides with an angle of incidence in a plane perpendicular to said axis substantially equal to one-half the angle of intersection in said plane of the sides of said prismoid and with an angle of incidence in the plane of said axis equal to $n\theta$ where $\theta$ is the angle between said sides and said axis, and where $2n$ is the number of reflections experienced by the compression wave while axially progressing toward said bottom and returning to said top, means for recovering said compressional waves, and means supporting said recovering means near said top to intercept said waves within said prismoid after said $2n$ reflections.

2. A delay line for compressional waves comprising a transmitting medium for said waves, a plurality of reflecting means mutually disposed in said medium in the relationship of the sides of an equilateral right prismoid and symmetrically disposed about the longitudinal axis of said prismoid, means for directing the compressional waves against one of said reflectors with an angle of incidence in a plane perpendicular to said axis equal to one-half the angle of intersection in said plane of the sides of said prismoid and with a small angle of incidence in the plane of said axis, whereupon said waves will be multiply reflected in three dimensions within said transmitting medium, and means for recovering said waves from said medium after said multiple reflections.

3. In a wave energy delay line of the type having a plurality of wave reflecting means to produce a circuitous wave propagation path for an incident wave, means for mutually orienting said reflecting means in a relationship coincident with the sides of an equilateral right prismoid and symmetrically disposed about the axis of said prismoid, means for introducing said incident wave at an angle of incidence in a plane prependicular to said axis equal to one-half the angle of intersection in said plane of the sides of said prismoid and at a small angle of incidence in the plane of the axis, and means for supporting the mutually oriented reflecting means.

4. A delay line for compressional waves comprising a transmitting medium for said waves having a particular acoustic impedance to said compressional waves, a plurality of reflecting means mutually disposed in said medium in the relationship of the side walls of a right equilateral truncated pyramid and symmetrically disposed about the axis of said pyramid, said reflecting means having an acoustic impedance substantially mismatched with that of said medium, means for directing the compressional waves against one of said reflectors near the base of said pyramid at an angle of incidence such as to produce successive reflections of the waves toward the apex of said pyramid and from one reflector to its adjacent reflector with successive angles of incidence having substantially equal first components in a plane perpendicular to the pyramid axis and progressively decreasing second components in planes containing said axis, whereupon the compressional waves are reflected successively around the pyramid walls while progressing axially toward said apex and returning to said base, and means near said base for recovering said waves after said successive reflections.

5. Means for delaying an external signal comprising first transducer means for converting the signal to a directional compressional wave signal, second transducer means for reconverting said compressional wave signal to the form of said external signal, and a delay path for said compressional wave connecting said first and second transducers, said delay path comprising a compressional wave transmitting medium having a particular acoustic impedance to said compressional waves, a plurality of reflecting means mutually disposed in said medium in the relationship of the side walls of a right equilateral truncated pyramid and symmetrically disposed about the axis of said pyramid, said reflecting means having an acoustic impedance substatially mismatched with that of said medium, means for directing the compressional waves against one of said reflectors near the base of said pyramid at an angle of incidence such as to produce successive reflections of the wave toward the apex of said pyramid and from one reflector to its adjacent reflector with successive angles of incidence having substantially equal first components in a plane perpendicular to the pyramid axis and progressively decreasing second components in planes containing said axis, whereupon the compressional wave is reflected successively around the pyramid walls while progressively axially toward said apex and returning to said base, and means near said base for recovering said wave after its successive reflections.

6. A delay line for compressional waves comprising a volume of transmitting medium having the form of an equilateral prism, said prism having a cross section defining an equilateral polygon and a longitudinal axis perpendicular to the plane of said cross section, reflecting means coincident with the plane of each side wall of said prism and symmetrically disposed about said axis, means for directing said compressional waves into said medium adjacent one end of said prism and against one of said reflectors with an angle of incidence in said cross sectional plane equal to one-half the angle of intersection in said cross sectional plane of the sides of said prism and with a small angle of incidence in a plane through said axis, whereupon said waves will be multiply reflected along a circuitous path in said medium, and means for recovering said waves from said medium after said multiple reflections.

7. A delay line for compressional waves comprising a transmitting medium for said waves, a plurality of reflecting means mutually disposed in said medium in the relationship of the sides of an equilateral prism and symmetrically disposed about the longitudinal axis of said prism, means for directing said compressional waves into said prism against one of said reflectors with an angle of incidence in a plane perpendicular to said axis equal to one half the angle of intersection in said plane of said prism sides and with a small angle of incidence in a plane through said axis, whereupon said waves will be recurrently reflected from said reflecting means while progressing simultaneously in the direction of said axis, and means for recovering said waves from said medium after said multiple reflections.

References Cited in the file of this patent

UNITED STATES PATENTS

| | | |
|---|---|---|
| 1,313,815 | Hansen | Aug. 19, 1919 |
| 2,505,364 | McSkimin | Apr. 25, 1950 |
| 2,505,515 | Arenberg | Apr. 25, 1950 |
| 2,753,528 | Ashby | July 3, 1956 |